United States Patent
Anderson

[15] 3,673,065
[45] June 27, 1972

[54] ELECTROLYTIC REMOVAL OF GREASY MATTER FROM AQUEOUS WASTES

[72] Inventor: Harry T. Anderson, Clarendon Hills, Ill. 60514

[73] Assignee: Swift & Company, Chicago, Ill.

[22] Filed: April 8, 1970

[21] Appl. No.: 26,769

[52] U.S. Cl. .................................................204/149, 210/44
[51] Int. Cl. .........................................C02b 1/82, B01k 3/04
[58] Field of Search.................204/180, 149, 184, 185, 186, 204/188, 190; 210/44

[56] References Cited

UNITED STATES PATENTS

| | | | |
|---|---|---|---|
| 1,529,349 | 3/1925 | Eddy | 204/190 |
| 1,540,929 | 6/1925 | Coblentz et al. | 204/185 X |
| 1,612,180 | 12/1926 | Groote | 204/190 |
| 1,617,741 | 2/1927 | Averill | 204/190 |
| 1,827,714 | 10/1931 | Morrell | 204/190 |
| 2,047,989 | 7/1936 | Woelflin | 204/190 X |
| 2,110,899 | 3/1938 | Woelflin | 204/190 |
| 2,825,686 | 3/1958 | Greene et al. | 204/190 |
| 2,849,395 | 8/1958 | Wintermute | 204/188 X |
| 3,458,434 | 7/1969 | Peter | 204/149 X |

FOREIGN PATENTS OR APPLICATIONS 154,185  8/1949  Australia ................................204/149

Primary Examiner—John H. Mack
Assistant Examiner—A. C. Prescott
Attorney—Edward T. McCabe, Charles E. Bouton and Jay C. Langston

[57] ABSTRACT

Fat-water emulsion systems are de-emulsified by impressing direct current electrical energy therethrough and positioned such that a carefully defined anolyte stream is formed. The anolyte stream, having low pH values, breaks the emulsion, enabling the fat to rise to the surface and to be skimmed off.

8 Claims, No Drawings

ELECTROLYTIC REMOVAL OF GREASY MATTER FROM AQUEOUS WASTES

This invention is directed to a method of treating waste water containing appreciable amounts of fats, grease, oily materials and polar materials such as proteins. The process is especially useful in connection with packinghouse and edible oil operations, but it can also be advantageously used for cleaning other types of fat-contaminated water, such as from industrial plants using mineral oils. The process is applicable to the economic recovery of valuable oils from emulsified systems as well as the mere removal of spent oil or greases from waste water so as to prevent contamination of rivers, lakes and seas.

Generally speaking, free fat, oil, i.e., non-emulsified fat and oil, present no serious problems in regard to separation from water as they will float to the surface and can be skimmed off. Emulsified fats, on the other hand, stay in solution causing severe separation problems.

It has been the usual practice in the past to run the waste water from the packinghouse to a settling tank or basin having baffles wherein the water would set for about ½ hour or more and the free fat would rise to the top and be skimmed off. The emulsified fat would of course remain in the water and would accompany it to the sewers. Various means such as aeration and complex apparatus have been employed in attempts to de-emulsify the waste waters. Usually, however, unless the emulsified oil was very valuable, no effort was made to separate it from the water that was passed to the sewers and hence to the rivers and seas.

In a few industries, solvent extraction and other unit processes are used to recover the valuable oil. Also, in processes where the water is reused, the oil can be removed from the system by coagulation with aluminum sulfate and alkali, followed by filtration through a nonsiliceous filter medium. The oil is caught in the floc formed, and the floc, with the entrained oil, strained out of the condensate by the filter. Periodical backwashings of the filter with hot caustic soda are required. It should be noted that those processes used to completely remove the oil from the water are clearly uneconomical for use in cleaning up waste water from packinghouse and edible oil operations. Yet on the other hand, it is desirable to remove these low-grade oils from sewage as they may be used as industrial cutting oils, etc. Further, it has now become necessary to clean up the water prior to its discharge into the rivers and seas.

Accordingly, it is one object of this invention to provide a practical means for separating emulsified fats, oils, greasy materials and polar materials such as protein from waste water systems.

It is another object of this invention to provide a process capable of more effective removal of solids from waste water.

Still another object is the provision of a method for the recovery of valuable oils and/or proteins from emulsified aqueous systems without using solvent extraction or other costly means.

Additional objects, if not specifically set forth herein, will be readily apparent to those skilled in the art from a reading of the detailed description of the invention which follows.

In general, this invention is concerned with the treatment of emulsified fat-water systems and comprises impressing direct electrical current in such a manner that a carefully defined, relatively deep, anolyte stream (i.e., a path of liquid in the immediate neighborhood of the anodes during electrolysis) is formed near the bottom of a receptacle at the entry end and becomes narrower in depth as it progresses upwardly to near the water surface at the opposite end or exit end of the receptacle. The anolyte stream, having a very low pH due to multiple anodes, breaks the emulsified fat enabling it to rise to the surface and be skimmed off. The system comprises multiple, submerged anodes, usually approximately equal distance apart, parallel to the longitudinal walls of a rectangular tank or other receptacle but inclined upwardly. In a circular tank, the anodes are parallel to the walls but substantially vertically mounted.

In establishing the electrical circuit, anodes are placed in contact with the waste water. The walls of the receptacle function as the cathode with the current flowing through the liquid from the anode to the cathode. A plurality of rod-shaped anodes starting just below the intake opening (point of entry of the waste water) of the tank are spaced progressively upward approaching the water surface in the tank at the opposite end. In a circular vessel, anodes are also parallel to the tank wall and usually perpendicular to the bottom. They are low enough to produce a low pH anolyte from the point of waste water entry to the upper region of the tank. While preventing re-emulsification of fat, they also prevent a potential drop in protein or cellulose fiber which would permit these solids to settle out of reach of the effective skimming means. All anodes are far enough below the water surface so that they do not interfere with the movement of skim bars.

While the walls of the receptacle will function as the cathode, equivalent embodiments can be used. For example, rods or sheets of metal placed sufficiently close to the walls of the receptacle, can act as suitable cathodes. This embodiment is useful when the walls of the receptacle are generally poor or non-conductors of electrical energy. In slaughterhouse operations, the holding tanks are normally comprised of carbon steel, stainless steel or other metal and the walls of these tanks are quite suitable for acting as the cathode in the electrical cell.

In designing the electrical circuit, careful consideration of the electrodes is important. Generally speaking, the anode can be any of the typical metals used in modern-day anode construction and which is compatible with the environment in which it is used. It is preferred, however, to use a highly siliconed iron anode inasmuch as such material has a very low attrition rate. However, for purposes of this invention, any material capable of carrying a current and having a low attrition rate can serve as the anode. Additional factors that should be considered when designing the electrical circuit include the electrode profile, surface conditions, resistance value of the electrode material, surface distance between electrodes, number of electrodes, electrode potentials and the geometry of the electrode placement configuration.

If the water-fat system is further contaminated with proteins, these polar materials will rise to the surface along with the fat and other solids and can be readily skimmed off. The anode should not operate at a potential capable of causing excess potential at the cathode as this will result in stress corrosion. Further, polarization restricts current flow producing an exertion in the fluid.

The source of electrical current can be either galvanic or impressed direct current. In this connection, the anodes are connected in parallel and an anode potential ranging between about 1 volt and 100 volts, preferably about 2.7 to about 12 volts is utilized. The actual potential utilized will depend upon the water hardness, resistance value, chlorine content, etc. Generally speaking, if the chloride ion content is high, i.e., sea water or other chloride ion source is present, a relatively low potential should be used so that free chlorine does not evolve at excess rates. Further the anode must not operate at a potential that will over-polarize the cathode which could result in stress corrosion. As polarization increases, calcium ion deposits on the tank wall.

More particularly, in carrying out the invention on packinghouse waste water, the steel tank wall (cathode) will already possess a potential of about 0.7 volts. It has been found that best results are accomplished when a copper-copper sulfate half cell at the tank wall has a value of about 0.85 volts or higher to produce good separation between the fat and water. This is particularly true in the case of steel structures. Readings at galvanized structure surfaces should read near 1 to 1.1 volts but may range up to about 1.5 volts.

Perhaps at this point it should be brought out that the physical location of the anodes is important in that they should all be submerged so as to not interfere with skim bars. More importantly, however, the anodes, while positioned relatively parallel to the longitudinal axis of the container, are also inclined progressively upward from the entry end to the opposite or exit end. Entry end anodes should be stationed such that they point slightly below the intake flow level of the waste water. Since the anolyte stream decreases in depth from the entry end to the exit end, the fat as it breaks from the emulsion along with other polar materials, tends to become more compressed and results in a fat layer (which may contain protein and fiber) floating on top of the waste water near the exit end of the container.

With an impressed current in operation generally low pH values are obtained near the anodes. In the immediate neighborhood of the anodes a pH value in the order of 1 to 3 are noticed while a pH value on the alkaline side, i.e., 7 to about 11 will be found near the cathode, i.e., walls of the tank. In some waste waters a large amount of alkali is present and the waste water may have a pH value ranging anywhere from 7 to about 11. The instant invention will operate satisfactorily on such waste waters but it has been found that if the waste water is reduced in pH value to less than about 7, better separation takes place. Sulfuric acid, hydrochloric acid, etc., may be used to drop the pH down to a value less than 7. It has also been found that typical flocculating agents may be added to the system to aid in forming flocs which rise to the surface along with the fat and may be removed from the system. These flocculating agents are desired when the pH of the waste water is above about 9.

The following examples are set forth as illustrated embodiments of the invention and are not to be taken in any manner as limiting the scope of the invention which is defined by the appended claims.

EXAMPLE I

A steel tank of about 60 ft. long by 10 ft. wide and 6 ft. deep was approximately ¾ filled with packinghouse waste water containing principally fat, proteins and cellulose. Ten high silica-iron anodes, each 1½ in. in diameter and 5 ft. long, were connected in parallel and positioned below the water surface in 2 rows parallel the longitudinal walls of the tank. The anodes were about 2½ ft. from the longitudinal walls and were inclined progressively upward from inlet end to outlet end with the two anodes nearest the inlet end positioned so as to be slightly below the point of entry of the incoming waste water. An electrical wire was connected to a high point of the tank wall, which acted as the cathode, and grounding this to the rectifier completed the circuit. Using a rectified DC current to energize the anodes, various voltages were applied. Voltages between about 6 volts and about 9 volts and a current of between about 20 amps. and about 35 amps. resulted in an anolyte stream with fat particles and other solids floating to the surface where they were removed by mechanical sweeps.

EXAMPLE II

Waste water from a meat packing plant was clarified in an electrical setup similar to that used in Example I. A current of 20 amps. and a potential of 9 volts was impressed on the system. Solids quickly rose to the surface and were skimmed off after ½ hour and 1 hour. After ½ hour there was about 25 percent reduction in total solids in the waste water effluent and about a 35 percent reduction in 1 hour.

EXAMPLE III

Two steel catch basins side by side and equipped with mechanical sweeps were filled with the same packinghouse waste water. One of the tanks was equipped with an impressed current system. In this tank, which is about 60 ft. long by 10 ft. wide and 6 ft. deep were positioned two rows of five anodes each made from high silica iron and being 1½ in. in diameter and 5 ft. long. The anodes were placed parallel to the longitudinal wall and inclined upwardly toward the exit end of the tank. The anodes were placed approximately 3 ft. from and parallel to the longitudinal walls. Using a potential of about 5.8 volts and a current of 22 amps., a definite difference was noted between the two basins. Fat and other solids rose to the top in the basin equipped with anodes. In order to increase the amount of solids, about 300 ppm. of sulfuric acid, 50 ppm of ferric sulfate and 2 parts of a cationic flocculant were added. Skim bars supporting rails ¾ in. below the surface area were not visible in the control unit. However, not only were rails visible in the test cell but the water was clear to such an extent that one could see the moving parts near the bottom of the catch basin.

EXAMPLE IV

A steel tank about 30 ft. long by 8 ft. wide and 5 ft. deep was equipped with two rows of 4 anodes per row and placed parallel and about 3 ft. from the longitudinal side of the tank. The anodes were made of high silica iron and were 1½ in. in diameter and about 5 ft. long. Waste water from an edible oil refinery flowed into the tank at a point of entry about 1½ ft. from the bottom of the tank. All anodes were inclined slightly upward with the two anodes closest the entry end positioned so that their tips were about 1½ ft. from the bottom of the tank. The initial pH of the water was about 8.7 and it was reduced to 5.8 in the anolyte stream. With the walls acting as the cathode, a DC rectifier was used to impress a current of about 15 amps. and a potential of about 7.5 volts on the system. Fat and other solids came together and rose to the surface where they were readily skimmed off.

Obviously many modifications and variations of the invention as hereinbefore set forth may be made without departing from the spirit and scope thereof, and therefore only such limitations should be imposed as are indicated in the appended claims.

I claim:

1. A process for separating greasy matter from an aqueous liquid so as to form a surface layer of said greasy material comprising contacting an emulsified water-fat solution in a substantially longitudinally shaped receptacle having an inlet end and an exit end with a plurality of rod-shaped anodes that are spaced approximately equal distance apart and substantially parallel to the longitudinal walls of the receptacle and inclined upwardly from the inlet end to the exit end, said inlet end anodes positioned slightly below the point of entry of the incoming emulsified liquid, impressing direct current energy across said anodes and a cathode in an amount of about 1 to 100 volts so as to form an anolyte stream having a pH of below about 7 whereby the greasy material separates from the water and floats to the surface where it is capable of being skimmed off.

2. The process of claim 1 wherein the anode potential ranges between about 2.7 and about 12 volts.

3. The process of claim 1 where the pH of the anolyte stream is below about 5.8.

4. The process of claim 1 wherein the pH near the anodes is below about four.

5. The method of claim 1 wherein acid is added to the system to aid in breaking the fat-water emulsion.

6. The method of claim 1 wherein a flocculating agent is added to the system to aid in making solids rise to the surface.

7. The process of claim 1 wherein the anodes are made of high silica iron.

8. The process of claim 1 wherein the anodes are substantially perpendicular to the bottom of the longitudinal tank.

* * * * *